Jan. 17, 1961     J. Z. DE LOREAN     2,968,358
SWING AXLE SUSPENSION FOR VEHICLE DRIVING WHEELS
Filed Dec. 30, 1957     5 Sheets-Sheet 2
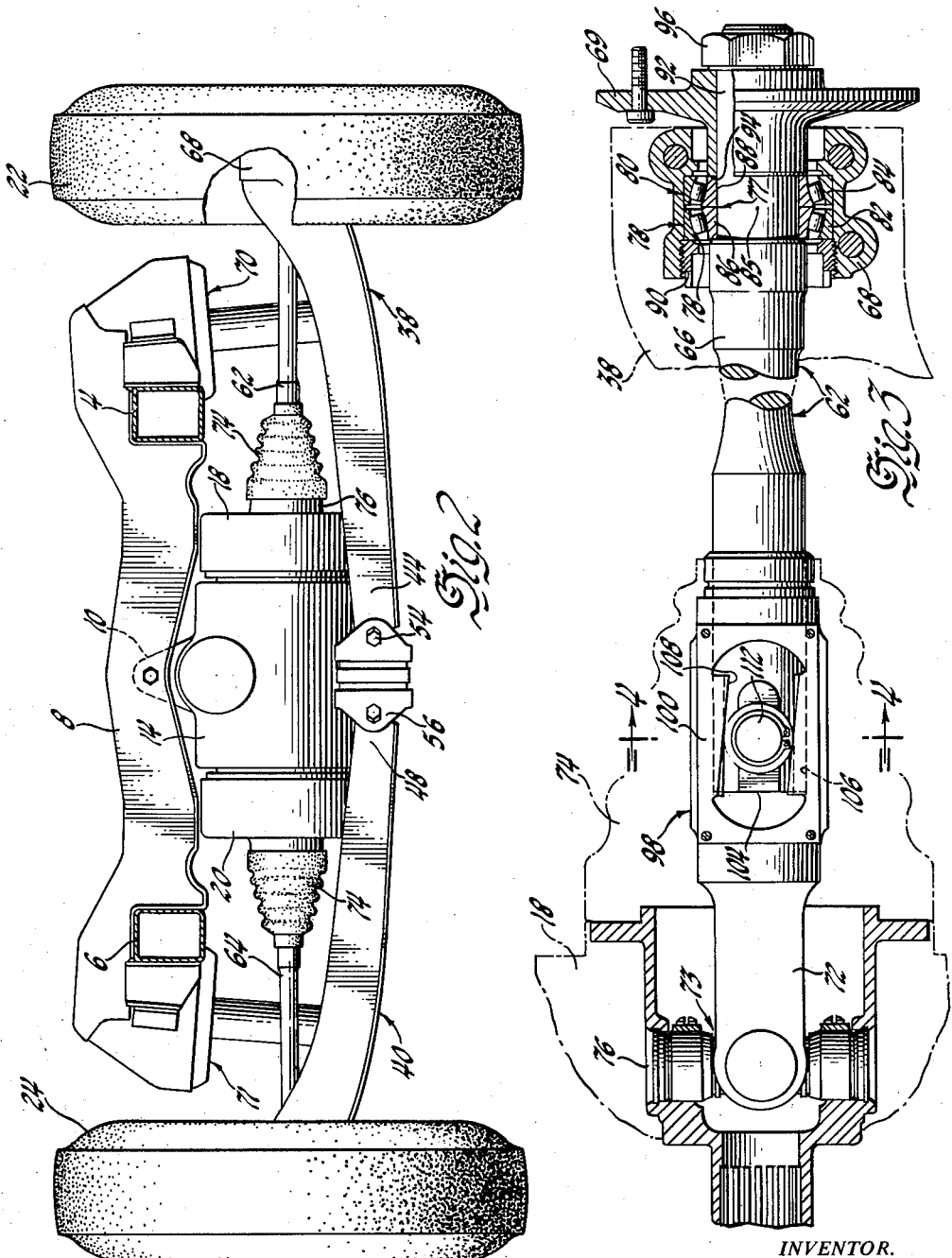
INVENTOR.
John Z. DeLorean
BY
W. S. Pettigrew
ATTORNEY INVENTOR.
John Z. DeLorean
BY
W. J. Pettigrew
ATTORNEY Jan. 17, 1961 J. Z. DE LOREAN 2,968,358
SWING AXLE SUSPENSION FOR VEHICLE DRIVING WHEELS
Filed Dec. 30, 1957 5 Sheets-Sheet 4
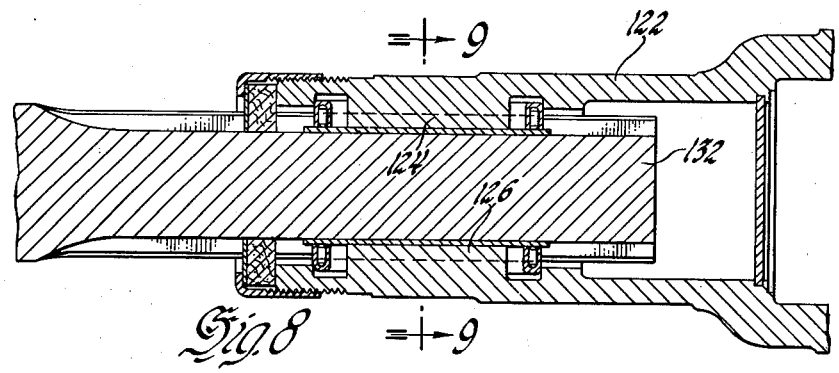
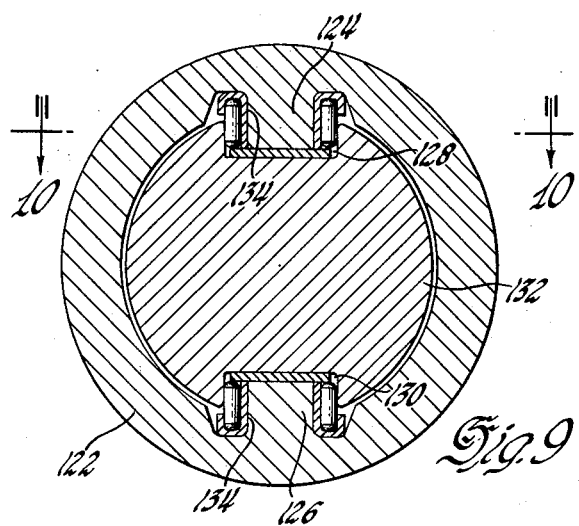
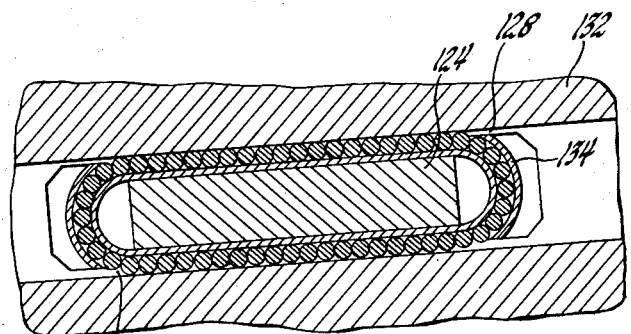
INVENTOR.
John Z. DeLorean
BY
W. S. Pettigrew
ATTORNEY Jan. 17, 1961     J. Z. DE LOREAN     2,968,358
SWING AXLE SUSPENSION FOR VEHICLE DRIVING WHEELS
Filed Dec. 30, 1957     5 Sheets-Sheet 5
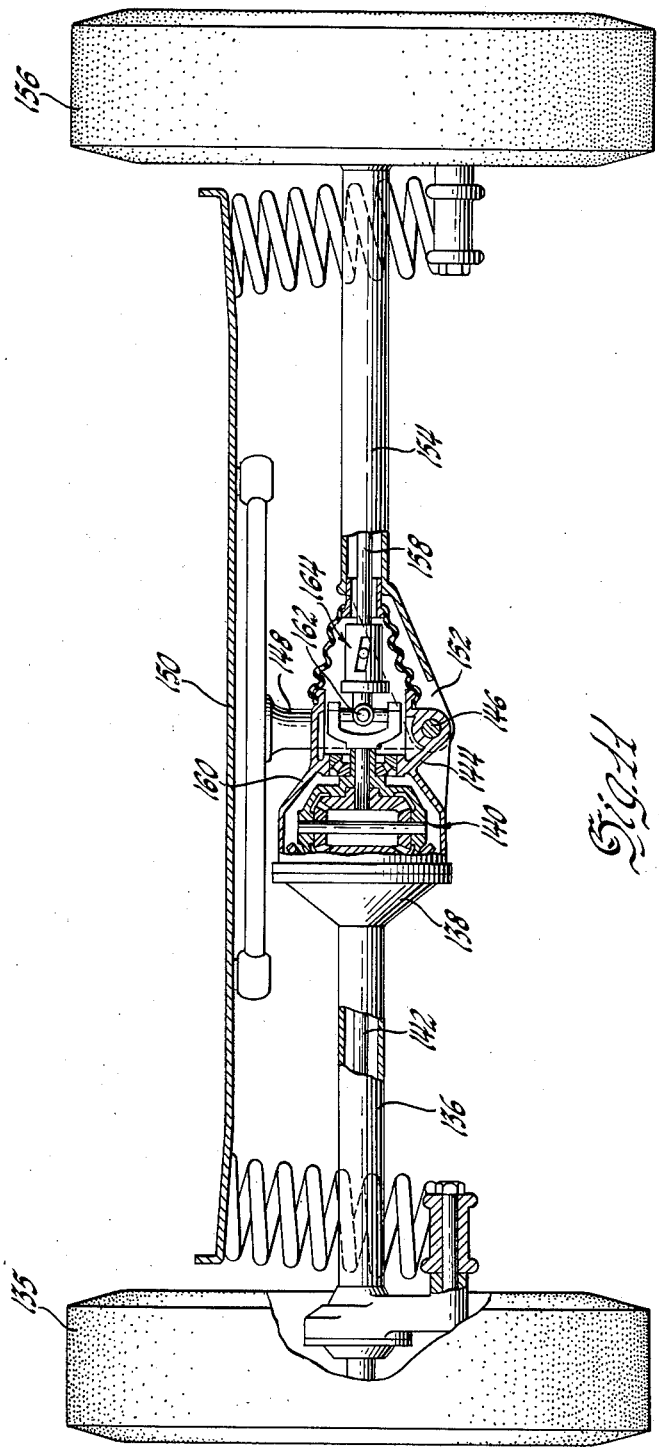
INVENTOR.
John Z. DeLorean
BY
W. S. Pettigrew
ATTORNEY United States Patent Office 2,968,358
Patented Jan. 17, 1961

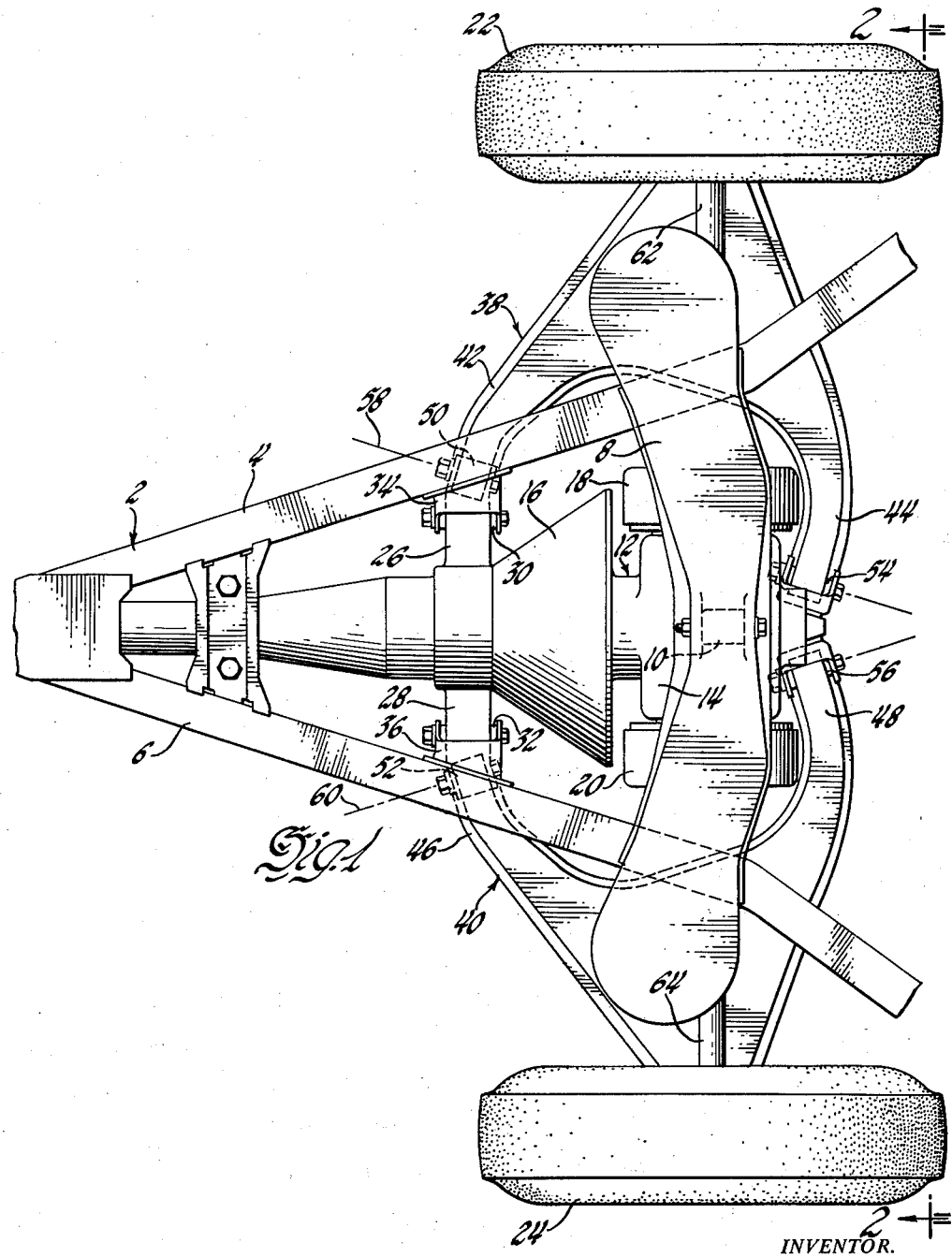

2,968,358

SWING AXLE SUSPENSION FOR VEHICLE DRIVING WHEELS

John Z. De Lorean, Birmingham, Mich., assignor to General Motors Corporation, Detroit, Mich., a corporation of Delaware Filed Dec. 30, 1957, Ser. No. 706,192

16 Claims. (Cl. 180—73)

This invention relates to independent suspension for the driving wheels of a vehicle and particularly to swing axle suspensions wherein the axis of motion of each wheel is spaced from the center of articulation of the driving axle therefor.

As used herein the term swing axle suspension refers to arrangements wherein the vehicle differential or axle drive is supported on the sprung mass and power is transmitted to the driving wheel by means of a swinging half axle having a universal joint connection with the differential or axle drive, while the deflection path of the wheel is controlled essentially by a generally laterally extending wheel supporting arm pivoted at its inboard end to the differential or sprung mass.

Numerous modifications of swing axle suspensions as defined herein are well known in the prior art. The present invention is particularly concerned with and is herein applied to swing axle constructions of the type wherein the pivot axis or axes of the wheel control arms are spaced vertically from the center of articulation of the universal joint on the live axle, familiarly referred to as a low pivot swing axle construction.

Although independent rear wheel suspension affords numerous advantages, such as substantially reduced unsprung weight, vehicles employing such suspension display a marked tendency to squat during acceleration and lift during braking due to weight transfer. While this problem is present in any suspension, in many cases it has proved susceptible to geometric solution. However, in the case of swing axle suspension, the solution has proved particularly elusive due to the fact that wheel deflection is confined to a single fixed axis of motion which affords an extremely limited latitude of geometric variation.

An object of the present invention is to provide an improved swing axle suspension.

Another object is to provide a low pivot swing axle construction for a vehicle which substantially resists acceleration squat and brake lift.

Still another object is to provide a low pivot swing axle construction for a vehicle which substantially resists acceleration squat and brake lift without affecting suspension geometry.

A further object is to provide a structure of the stated character wherein resistance to squat and lift is accomplished by means of a telescoping helical spline disposed in the driving half axle, the angular direction of the spline being such that driving torque tends to extend the length of the half axle while braking torque tends to reduce the length thereof.

A still further object is to provide an independent suspension for the driving wheels of a vehicle wherein each wheel guiding arm is pivoted on a generally horizontally extending axis inboard of the wheel, power being transmitted to the wheel by an articulated live axle spaced vertically from the pivot axis of the wheel guiding arm, the live axle including a splined slip connection which responds to an acceleration or braking torque respectively to exert an outward or inward thrust component, respectively, on the axle, which is transmitted to the wheel guiding arm so as to substantially balance the downward or upward force, respectively, exerted thereon by the rear portion of the sprung mass under the influence of acceleration or braking, respectively.

These and other objects, advantages and features of the invention will become more fully apparent as reference is had to the accompanying specification and drawings wherein:

Fig. 1 is a plan view of the rear portion of a vehicle having a swing axle independent rear wheel suspension incorporating the present invention;

Fig. 2 is a rear elevational view of the suspension shown in Fig. 1;

Fig. 3 is an enlarged fragmentary view, partly in section, showing the details of construction of the driving axle utilized in the construction;

Fig. 8 is an enlarged fragmentary view, partly in section, illustrating a modified form of live axle construction;

Fig. 9 is an enlarged fragmentary sectional view, looking in the direction of arrows 9—9 of Fig. 8;

Fig. 10 is an enlarged fragmentary view, partly in section, looking in the direction of arrows 10—10 of Fig. 9; and Fig. 11 is a schematic view of a modified form of swing axle suspension incorporating the invention.

Figure 4:
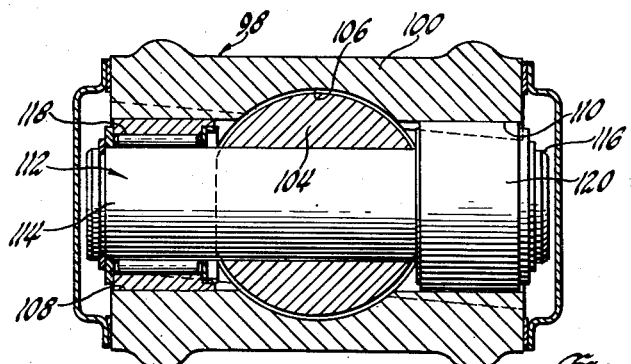
Fig. 4 is an enlarged fragmentary view, partly in section, looking in the direction of arrows 4—4 of Fig. 3.

Referring now to the drawings and particularly Fig. 1, there is illustrated the rear portion of a vehicle chassis wherein the reference numeral 2 designates the frame. In the illustrated embodiment, frame 2 is a cruciform configuration in which the rearwardly extending side rails 4 and 6 progressively diverge in a rearward direction. Extending transversely of the vehicle is a frame cross member 8 which is connected near each of its opposite ends to the adjacent side rails 4 and 6. Disposed below cross member 8 and suspended therefrom by means of a suitable resilient connection 10, as for example a bushed pin joint, is a unitary power transmitting assembly 12 which includes a differential section 14 and transmission or torque converter section 16. Converter section 16 is operatively connected, in any suitable manner, to the usual vehicle power plant, not shown. In the illustrated embodiment, brake mechanisms 18 and 20 for each wheel 22 and 24 are mounted on differential 14 at lateral opposite sides thereof. Inasmuch as the specific construction of brakes 18 and 20 forms no part of the present invention, description thereof is omitted, it being understood that any suitable form of inboard brakes may be utilized. Rigidly connected to and extending from laterally opposite sides of transmission 16 are a pair of supporting arms 26 and 28 which are resiliently connected by bushed pin joints 30 and 32 to inboard brackets 34 and 36 formed on side rails 4 and 6, respectively. It will now be seen that the entire transmission, differential and braking aggregate is resiliently suspended from frame 2 on a relatively widespread triangular base defined by joints 10, 30 and 32.

Extending laterally outwardly from either side of differential 14 are a pair of wheel control arms 38 and 40. Arms 38 and 40 take the form of wishbones or A-frames having inboard legs 42 and 44 and 46 and 48, respectively, which are spaced apart substantially in a longitudinal direction. Forward legs 42 and 46 are resiliently pivotally connected by bushed pin joints 50 and 52 to the arms 26 and 28 on the transmission section 16, while rearward legs 44 and 48 are resiliently pivotally connected to differential section 14 by bushed pin joints 54 and 56. As seen in Figs. 1 and 2, respectively, the axes of motion 58 and 60 of arms 38 and 40 converge toward the rear as viewed in plan, while the vertical level of said axes is spaced substantially below the power transmitting assembly.

Referring now to Fig. 2, it will be seen that differential 14 has extending therefrom a pair of laterally oppositely directed driving axles 62 and 64 which operatively connect the usual internal gearing, not shown, of differential 14 with driving wheels 22 and 24, respectively. As seen best in Fig. 3, the outer end 66 of axle 62 is rotatably supported in a hub portion 68 formed on the outer end of wheel control arm 38, the wheel 22 being adapted for rigid attachment to a wheel flange 69 threadably connected at the outer extremity of the axle. Resilient support of frame 2 with respect to wheels 22 and 24 is provided by any suitable elastic medium, as for example air spring assemblies 70 and 71 interposed between the outboard ends of cross member 8 and arms 38 and 40, respectively.

In order to permit independent movement of each wheel with respect to the frame 2, while providing continuous driving engagement with between differential 14 and wheel 22, the inner end 72 of axle 62 is provided with a Carden or similar universal joint structure 73 which is normally surrounded by a flexible boot 74 attached to differential output member 76 extending through brake assembly 18. It will be understood that the structure of Fig. 3 is duplicated on the opposite side of the vehicle.

Inasmuch as the center of articulation of universal joint 73 is spaced substantially vertically above and somewhat inboard of the axis of motion 58 for control arm 38, it will be evident that progressive wheel deflection from the design height position shown will require continuous change in the angular relation between control arm 38 and its associated live axle. To accommodate this change in angular inclination, in accordance with one feature of the invention, the hub portion 68 of control arm 38 is provided with an anti-friction bearing structure 77 wherein a pair of barrel roller bearing assemblies 78 and 80 which are arranged in opposed back-to-back relation so as to function in the same manner as a spherical bearing. To this end, the outer races 82 and 84 of each assembly are formed with a radii of curvature generated from a point 85 located axially midway therebetween and at the rotational center of axle 62. The inboard races 86 and 88, in turn, are provided with reversely corresponding radii of curvature. When in assembled relation, outer races 82 and 84 are locked in hub 68 of arm 62 by threaded lock ring 90, while the inboard races are locked on the reduced portion 92 of axle 38 by the shoulder portion 94 of flange 69 under the influence of lock nut 96. It will now be seen that the bearing structure not only accommodates change in angular relationship of axle 62 and wheel control arm 38, but also acts as a thrust bearing preventing relative axial movement therebetween. As a result, the compression and rebound deflection path of wheel 22 is determined essentially by the axis of motion 58 of arm 38. This being the case, the axis of motion is preferably disposed at a relatively low vertical level, as previously described, so as to minimize variation in tread width between wheels 22 and 24 resulting from camber change accompanying normal wheel deflection.

Inasmuch as the bearing structure 77 prevents relative axial movement between the outer end 66 of axle 62 and arm 38, it will be evident that normal wheel deflection also requires limited increase and decrease in the effective overall length of axle 62 between universal joint 73 and bearing 77 due to the dissimilar arc of movement of arm 38 and axle 62. In accordance with the present invention, the relative movement referred to is accommodated by a spline coupling assembly 98 which, in the preferred embodiment, is interposed in shaft 62 immediately outboard of universal joint 73. In the embodiment shown in Figs. 3 and 4, coupling 98 comprises a sleeve member or female portion 100 integrally formed on the inner part 72 of axle 62 and a male portion 104 on the outer part 66 of axle 62. Female portion 100 is provided with an axial bore 106 and a pair of radially directed axially extending elongated slots 108 and 110 which define a helical path, the purpose of which will be described shortly. Male portion 104 is received in bore 106 and is provided with a cylindrical cross pin 112, the opposite ends 114 and 116 of which extend respectively into helical slots 108 and 110. Surrounding ends 114 and 116 and engaging helical slots 108 and 110 are a pair of anti-friction needle bearing assemblies 118 and 120.

Figure 5:
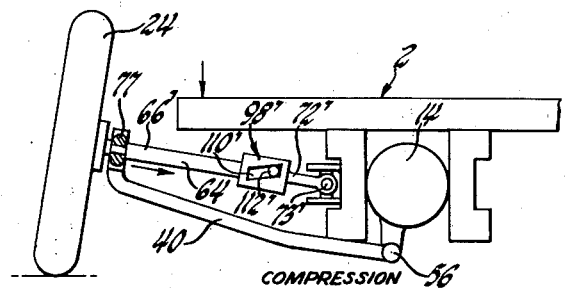
Figs. 5, 6 and 7 are diagrammatic illustrations showing the kinematic relationship of the suspension and drive parts under various conditions of static loading, acceleration and braking.
Figure 6:
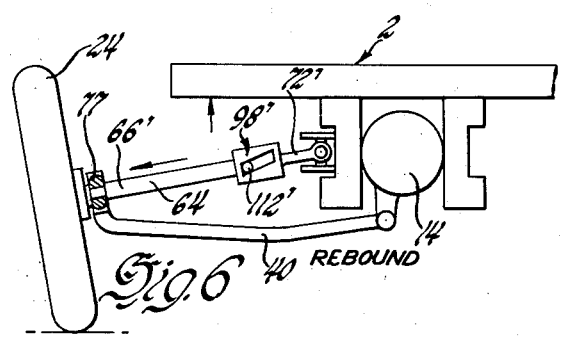
Figure 7:
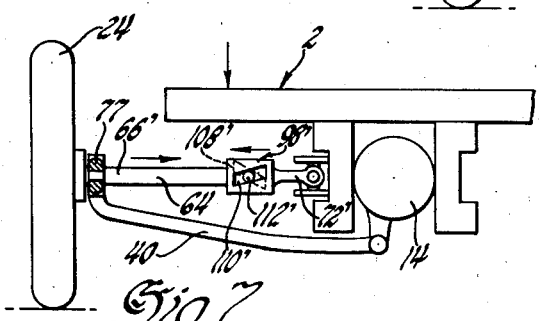

In order that the purpose and mode of operation of splined connection 98 may be fully understood, a description of the operation of the suspension and drive means under various vehicle operating conditions follows, reference being made particularly to Figs. 5, 6 and 7, which illustrate the left rear wheel suspension as viewed from the rear.

Fig. 5 illustrates the condition which obtains when the vehicle frame 2 is subjected to increased vertical loading in the absence of substantial torque on the inner part 72' of axle 64, as for example, when the vehicle is at rest or when moving at a relatively uniform rate of speed. Under these circumstances, the entire sprung mass, including the transmission and inboard end of wheel control arm 40, is caused to move downwardly with respect to the ground. Since the wheel 24 is already on the ground, both the control arm 40 and axle 64 are required to swing upwardly about axis 56 and the center of universal joint 73', respectively. Since the outer part 66' of axle 64, as for example, when the vehicle is at rest ence to the outer end of control arm 40, the angular movement just described causes inward telescoping movement of cross pin 112' in helical slots 108' and 110'. Fig. 6 illustrates the opposite condition which obtains when frame 2 is relieved of vertical load. However, as seen in Fig. 7, if increased vertical loading on frame 2 occurs as a result of weight transfer caused by vehicle acceleration, it follows that relatively high driving torque is being applied to the inner part 72' of axle shaft 62. Under these conditions, driving torque on part 72' acts through helical slots 108' and 110' on cross pin 112' to exert an outward component of thrust on the outer part 66' of axle shaft 64, which is transmitted through thrust bearing 77 to offer resistance to upward swinging movement of arm 40 sufficient to counteract the increased vertical loading resulting from acceleration weight transfer. Conversely, when the inboard brakes are applied while the vehicle is in motion, a retarding torque is applied to the inner part 72' which reverses the direction of axial thrust developed by the helical splines and exerts a pulling action on outer part 66' tending to counteract lifting of the sprung portion which normally accompanies deceleration weight transfer. It will now be seen that helical spline coupling 98' allows normal rising and falling of the wheel to surmount road obstacles whenever torque loading on part 72' is relatively low. Hence, whenever the vehicle is either at rest or progressing at a relatively constant speed, the helix angle of slots 108' and 110' offer little or no resistance to axle telescoping and related wheel deflection. It should here be particularly noted that because the squat and dive resistance is essentially a function of acceleration and deceleration torque, compromises in suspension geometry which might adversely affect optimum handling and roll steer characteristics, are avoided. Furthermore, the invention does not in any way adversely affect the suspension geometry selected. In consequence, suspension providing geometric understeer in roll may be achieved without sacrificing the benefits of squat and lift control. By way of comparison, if dive and lift control in swing axle constructions is accomplished as a function of suspension geometry, then understeer in roll as a function suspension, is lost, since the wheel deflection axis required for one will not produce the other, and vice versa.

In Figs. 8, 9, 10 and 11, there is illustrated a modified form of spline coupling wherein the reference numeral 122 designates a generally cylindrical female member having radially inwardly directed helically generated ribs 124 and 126 which extend into corresponding helically generated slots 128 and 130 formed on the outer periphery of a male member 132. As seen best in Figs. 9 and 10, a plurality of needle bearings are supported in an elongated loop cage structure 134 in a manner providing anti-friction engagement between the opposed edges of the ribs 124 and 126 and slots 128 and 130, respectively. It will be understood that the angular direction of the helix in each case will be such that torque applied to male member 132 causes ribs 124 and 126 to act on grooves 128 and 130 to exert outward thrust on the male member 132, while braking torque applied to member 122 exerts a reverse or inward thrust on male member 132. It should also be understood that any suitable number of splines may be employed, two being shown herein for illustration purposes only.

In Fig. 11, the invention is shown applied to a form of independent rear wheel suspension commonly known as a single universal joint low pivot swing axle. In the schematic embodiment shown, one wheel 135 is rotatably supported at the outer end of a hollow axle casing 136 which at its inboard end is formed with an enlarged housing 138 in which is disposed a differential mechanism 140 of conventional construction. Axle housing 136 contains a driving axle 142 which operatively connects wheel 135 with differential mechanism 140. Formed integrally on housing 138 is a depending ear 144 which is pivotally connected to longitudinally directed shaft 146 carried on the lower end of a depending bracket 148. Bracket 148, in turn, is connected at its upper end to the vehicle frame 150. Coincidentally pivoted on shaft 146 is a depending ear 152 which is integral with a second tubular axle housing 154. At its outer end, housing 154, in turn, rotatively supports the opposite wheel 156. Wheel 156 is driven by a second axle shaft 158 which is operatively connected to differential mechanism 140 by a single universal joint 160 having a center of articulation 162 which is spaced substantially above shaft 146 in substantial vertical alignment therewith. Interposed between universal joint 160 and axle 158 is a splined coupling 164 similar to coupling 98 previously described in connection with the preferred embodiment. Inasmuch as the common axis of motion of both axle housings 136 and 154, defined by shaft 146, is spaced from the center of articulation 162 of the two live axles 142 and 158, it will be evident that acceleration torque applied to the female portion of coupling 164 will exert an outward component of thrust on each axle which is transmitted through the respective housings 136 and 154 to pivot shaft 146 to exert an upward thrust through bracket 148 on the sprung portion of the vehicle which counteracts the squatting tendency resulting from acceleration load transfer.

While several embodiments of the invention have been shown and described, it will be evident that other changes and further modifications may be made therein. It is, therefore, to be understood that it is not intended to limit the invention to the embodiments shown, but only by the scope of the claims which follow.

What is claimed is:

1. Independent suspension for vehicle driving wheels comprising, power transmitting means including a housing, a wheel, a wheel supporting arm pivoted on said housing at a vertical level spaced from said wheel axis, and drive means between said wheel and power transmission means including a helical spline connection, the direction of the helix being such that acceleration torque imparts axial thrust on said driving means in a direction resisting upward swinging movement of said wheel supporting arm.

2. In a device of the class described, power transmission means including a housing, a wheel, a wheel control arm pivoted on said housing laterally inboard of said wheel on an axis spaced vertically from said wheel axis, drive means operatively connecting said power transmission means and wheel, and axially telescoping means associated with said drive means, said telescoping means including structure adapted to resist axial telescoping in either direction respectively responsive to torque application in either direction, respectively.

3. In a device of the class described, power transmission means including a housing, a wheel, a wheel control arm pivoted on said housing laterally inboard of said wheel on an axis spaced vertically from said wheel axis, drive means operatively connecting said power transmission means and wheel, and axially telescoping means associated with said drive means, said telescoping means including helically disposed parts acting to resist axial telescoping in either direction respectively responsive to torque application in either direction, respectively.

4. In a device of the class described, power transmission means including a housing, a wheel, a wheel control arm pivoted on said housing laterally inboard of said wheel on an axis spaced vertically from said wheel axis, drive means operatively connecting said power transmission means and wheel, axially telescoping means associated with said drive means, said telescoping means including helix structure adapted to resist axial inward telescoping responsive to torque application in one direction and axial outward telescoping responsive to torque application in the other direction, and means rotatably supporting one end of said drive means on said wheel control arm in a manner preventing relative lateral movement therebetween.

5. In combination, an axle carrier including a driving member, a driving wheel, a vertically swingable wheel guiding arm connected at its inboard end to said axle carrier, a driving axle connected at one end to said wheel and at the other end to said driving member by a universal joint having its center of articulation disposed at a distance from the pivot axis of said arm, a normally extensible splined coupling associated with said driving axle in a manner permitting axial movement of the latter relative to said axle carrier, said coupling comprising at least one helical portion, and means coacting with said helical portion effective under the influence of torque application to resist said axial movement.

6. In a vehicle having driving wheels and a frame supported power transmission member, means for suspending and driving each wheel independently comprising, a swinging drive axle engaged at its outer end with said wheel, a wheel control arm, the outer end of said control arm including an axial thrust bearing rotatably supporting the outer end of said driving axle, said axle and said arm being so disposed that the effective planes thereof form two legs of a triangle, the base of which is defined by the power transmission means, said axle including a helical spline sliding joint normally allowing change in the effective length thereof as required by angular movement of said arm resulting from rising and falling movement of said wheel but effective under the influence of driving and retarding torque to resist said change in length.

7. In a vehicle having a frame with a differential mounted thereon, a swing arm hinged on said frame, a spring disposed between said arm and said frame to resiliently support the latter, a driving axle, said axle having its outer end rotatably supported on the outer end of said arm in a manner preventing relative axial movement, a universal joint at the inner end of said axle operatively connected to said differential, the hinge axis of said arm being spaced vertically below the center of articulation of said universal joint, and an axially slidable coupling in said driving axle normally accommodating the dissimilar arcs of movement of said axle and arm by allowing axial extension and contraction of the latter, said coupling including helically disposed cooperating parts whereby acceleration and retarding torque applied to said universal joint causes the said coupling to exert an axial thrust component counteracting the normal extension or contraction of said axle so as to prevent squatting or lifting of the frame as a result of acceleration or retarding of the vehicle.

8. In a motor vehicle, a supported portion, a driving wheel secured on the outer end of a half axle, a universal joint at the inner end of said axle, means on said supported portion for applying torque to said universal joint, a rigid arm having an outer hub portion rotatably supporting said wheel and the outer end of said axle, the inner end of said arm being pivoted on said supported portion on an axis spaced from the center of articulation of said universal joint, and a splined coupling interposed in said half axle, the splines of said coupling being arranged in the form of a helix so that telescoping movement of said coupling normally occurring as a result of rising or falling respectively of said wheel is resisted by application of accelerating or retarding torque respectively.

9. In a motor vehicle, a supported portion, a driving wheel secured on the outer end of a half axle, a universal joint at the inner end of said axle, means on said supported portion for applying driving and braking torque to said universal joint, a rigid arm having an outer hub portion rotatably supporting said wheel and the outer end of said axle, means preventing relative axial movement between said wheel and said arm, the inner end of said arm being pivoted on said supported portion on an axis spaced from the center of articulation of said universal joint, and a splined coupling interposed in said half axle, the splines of said coupling being arranged in the form of a helix so that telescoping movement of said coupling normally occurring as a result of rising or falling respectively of said wheel is resisted by application of accelerating or braking torque respectively.

10. The invention set forth in claim 9 wherein said means preventing relative axial movement between said wheel and said arm comprises a pair of barrel type roller bearing assemblies disposed in oppositely facing relation between said arm and said axle, each bearing having a curved outer race, the radius of which is generated from a point common to the radius of curvature of the other race.

11. The invention set forth in claim 9 wherein said means preventing relative axial movement between said wheel and said arm comprises a radial and thrust load bearing disposed between said arm and said axle, said bearing assembly including a pair of reversely similar barrel type roller bearing assemblies disposed in back-to-back relation, the outer races of each assembly having a common radius of curvature, whereby to accommodate changes in angular relation between said axle and said arm incident to rise and fall of said wheel.

12. In a motor vehicle, a supported portion, a driving wheel secured on the outer part of a two-part half axle, a universal joint connected to the inner part of said axle, means on said supported portion for applying driving and braking torque to said universal joint, a rigid arm having an outer hub portion rotatably supporting said wheel and the outer part of said two-part axle, means preventing relative axial movement between said arm and the outer part of said axle, the inner end of said arm being pivoted on said supported portion on an axis spaced from the center of articulation of said universal joint, and a splined coupling between said two parts of said half axle, the splines of said coupling being arranged in the form of a helix so that telescoping movement of said coupling is permitted in the absence of torque, while inward telescoping movement is resisted by acceleration torque and outward telescoping movement is resisted by retarding torque.

13. In a swing axle wheel suspension of the type wherein the wheel is guided by a single control arm pivoted on an axis inboard of the wheel plane, power means, rotary driving means connecting said wheel and said power means, and a helical splined coupling interposed in said drive means between said power means and said wheel.

14. The structure set forth in claim 13 wherein said coupling comprises a male part and a female part, said female part having helical slots formed therein which are closed at their opposite ends, radially projecting portions on said male part extending into said slots, and antifriction bearings carried by said radially projecting portions engaging said slots.

15. In a swing axle wheel suspension of the type wherein each driving wheel is guided by a separate control arm, each of which is pivoted on a common axis inboard of the wheel planes, power means, rotary driving means connecting said wheels and said power means, said driving means including only one universal joint, the center of articulation of which is spaced from said common axis, and a helically splined coupling interposed in said drive means between said universal joint and one of said wheels.

16. In a swing axle wheel suspension of the type wherein each driving wheel is guided by a separate control arm, each of which is pivoted on a common generally horizontal axis inboard of the wheel planes, power means, rotary driving means connecting said wheels and said power means, said driving means including only one universal joint, the center of articulation of which is spaced vertically from said common axis, and a helically splined coupling interposed in said drive means between said universal joint and one of said wheels.

References Cited in the file of this patent

UNITED STATES PATENTS

| | | |
|---|---|---|
| 958,155 | Muther | May 17, 1910 |
| 1,918,108 | Jonkhoff | July 11, 1933 |
| 2,107,070 | Fleury | Feb. 1, 1938 |